Figure 1:
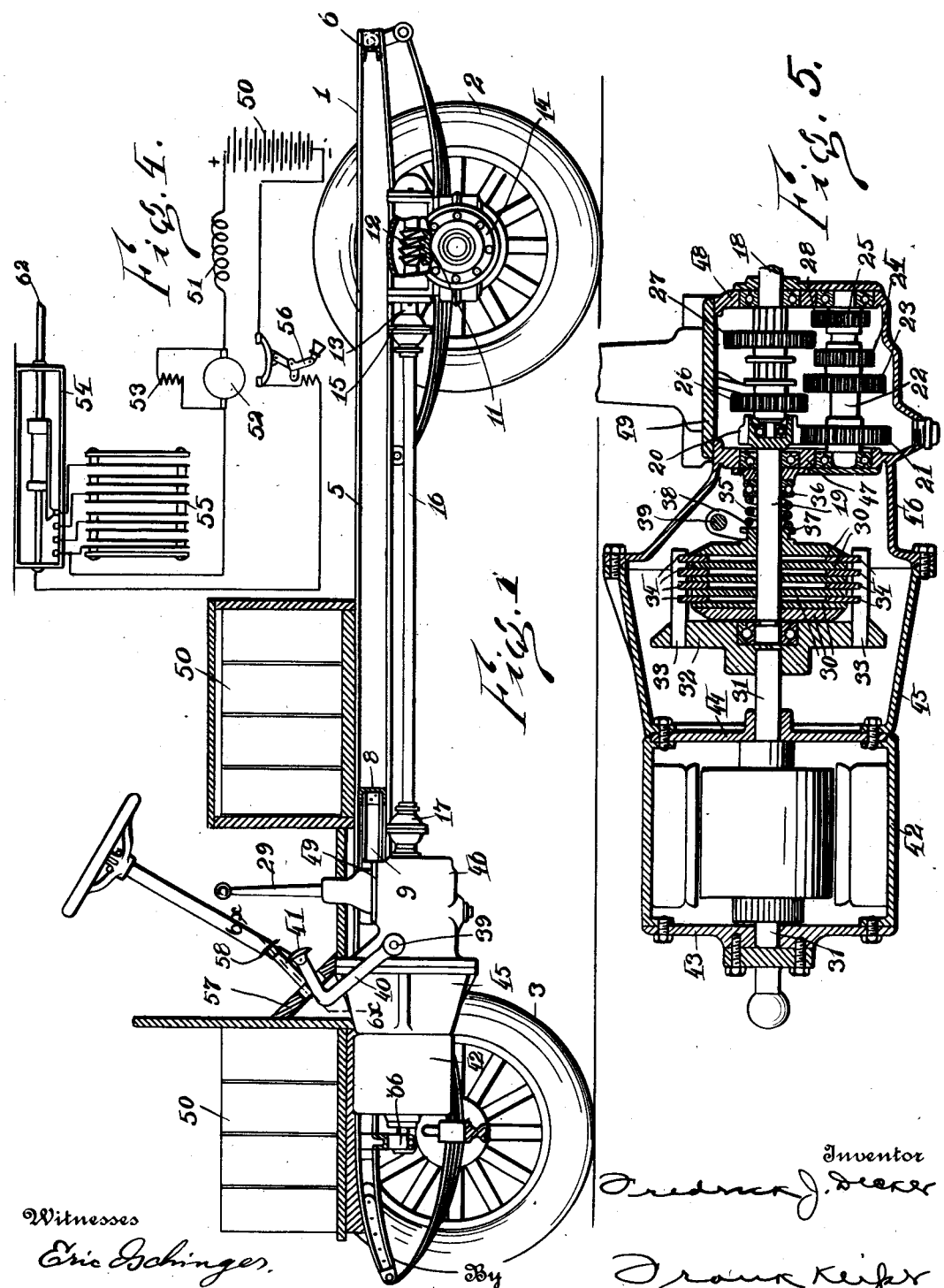

F. J. DECKER.
ELECTRIC TRUCK.
APPLICATION FILED JUNE 9, 1915.

1,179,407.

Patented Apr. 18, 1916.
2 SHEETS—SHEET 2.

Witnesses
Eric Schinger
Eleanor M. Corcoran

Inventor
Fredrick J. Decker
By Frank Keifer
Attorney

UNITED STATES PATENT OFFICE.

FREDERICK J. DECKER, OF ROCHESTER, NEW YORK, ASSIGNOR TO SHAFER-DECKER COMPANY, OF ROCHESTER, NEW YORK, A CORPORATION OF NEW YORK.

ELECTRIC TRUCK.

1,179,407.  Specification of Letters Patent.  Patented Apr. 18, 1916.

Application filed June 9, 1915. Serial No. 33,171.

*To all whom it may concern:*

Be it known that I, FREDERICK J. DECKER, a citizen of the United States, residing at Rochester, in the county of Monroe and State of New York, have invented certain new and useful Improvements in Electric Trucks, of which the following is a specification.

The object of this invention is to provide a new and improved form of electric truck.

Another object of the invention is to so arrange the gearing of the truck to permit use of an electric motor that can be started independently of the truck.

Another object of the invention is to arrange the gearing of the truck so that it will be driven by an electric motor having a constant speed characteristic or a fairly uniform R. P. M.

Another object of the invention is to arrange the parts so that a friction clutch can be interposed between the motor and the change speed gearing.

Another object of the invention is to provide a three point suspension for the motor permitting easy removal and replacement of the motor.

These and other objects of the invention will be fully illustrated in the drawings, described in the specification and pointed out in the claims at the end thereof.

Figure 2:
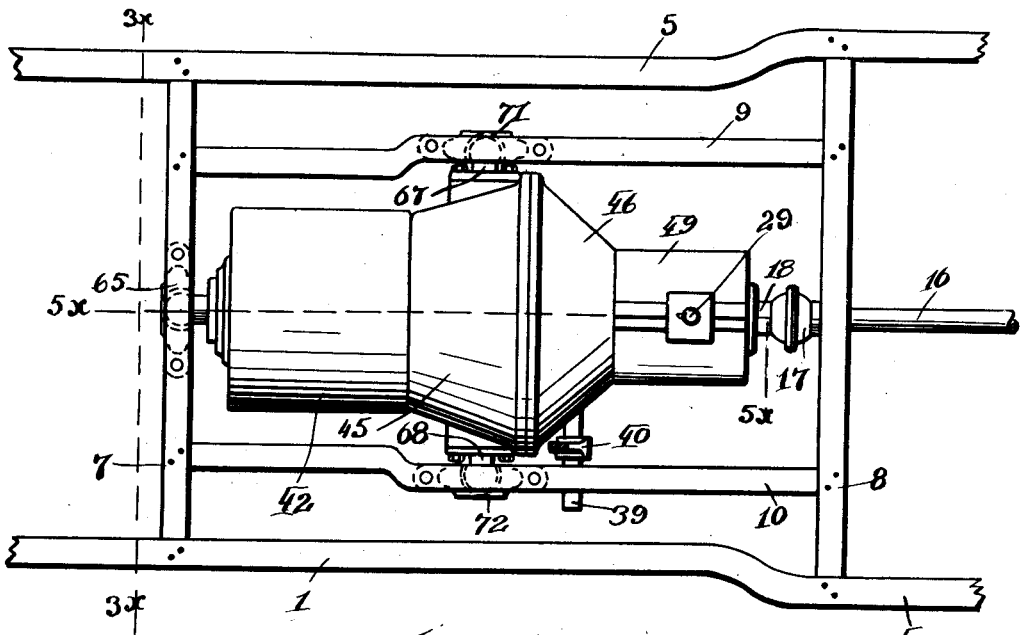
Figure 3:
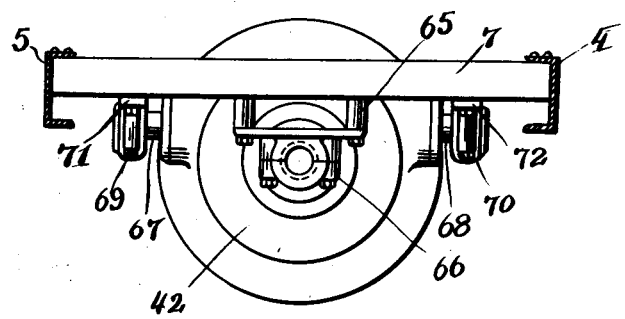

In the drawings, Figure 1 represents a side elevation of the truck partly in section showing the motor and running and driving gear thereof. Fig. 2 is a plan view of the motor suspension viewed from above. Fig. 3 is a vertical section on the line 3ˣ—3ˣ of Fig. 2. Fig. 4 is a diagrammatic view of the electrical connections. Fig. 5 is a vertical section through the motor casing and through the clutch and sliding gear transmission and their casings, the section being taken on the line 5ˣ—5ˣ of Fig. 2.

In the drawings like reference numerals indicate like parts.

In the drawings reference numeral 1 indicates the frame of the truck supported at the rear by two driving wheels one of which is indicated at 2 and at the front by two steering wheels, one of which is indicated at 3. The frame of the truck comprises two bars running lengthwise of the truck indicated by the reference numerals 4 and 5, which are connected at the rear of the truck by the cross bar 6 and near the front of the truck by the cross bars 7 and 8. Between the cross bars 7 and 8 are provided the auxiliary side bars 9 and 10. The bars 7, 8, 9 and 10 constitute an auxiliary subframe having for its object the support of the motor, clutch and sliding gear transmission, the details of which will presently be described. All of the bars 4, 5, 6, 7, 8, 9 and 10 are channeled bars and are fastened together by riveting or welding or both.

The driving wheels 2 are driven through the differential 11 of the ordinary type which in turn is driven by a worm 12, carried on a propeller shaft 13, the differential and worm being carried within a casing 14 which is partly broken away at the top for the purpose of disclosing the differential and worm.

A propeller shaft 13 extends forward and connects to the universal joint 15, which joint in turn connects to the main shaft 16. At the forward end of the main shaft 16 is a universal joint 17 which in turn connects with the main shaft 18, which is driven from the pocket shaft 19 by the transmission gear which I will now describe.

On the end of the pocket shaft 19 is a small pinion 20, which meshes with a large pinion 21 keyed to the counter shaft 22 on which counter shaft is keyed the intermediate pinion 23 for driving at the second speed and a small pinion 24 for driving at the low speed and the pinion 25 for the reverse speed. Splined on the shaft 18 are the pinions 26 and 27, each of which pinions can be moved along the shaft independent of the other. The pinion 26 can engage directly and positively with the pinion 20 so as to be driven thereby when moved forward into engagement therewith and when so driven will serve to drive the power shaft at high speed. The pinion 26 can be disengaged from the pinion 20 and engaged with the pinion 23 in which case it will drive the car at a second or intermediate speed. The pinion 27 can engage with the pinion 24 in which case the car will be driven forward at low speed, or it can engage with the idler 28 which in turn meshes with the reverse pinion 25 for the purpose of driving the car backward at low speed.

The shafts 18 and 22 and gearing associated therewith are carried within a tight casing covered with a plate 49 through which extends a lever 29 by which the selecting and shifting of the gears is accomplished, this lever making engagement separately with either of the hubs of the pinions 26 and 27 for this purpose.

Forward of the transmission gear and casing is the clutch having the disks 30 splined on the shaft 19. Forward of the pocket shaft 19 is the shaft 31 on which the armature of the motor is carried. Keyed to the shaft 31 is the disk 32 on which is carried the pins 33, 33 which make sliding engagement with the rings 34 which are alternated with the disks 30. A spring 35 is provided surrounding the shaft 19 bearing against the thrust bearing 36 at the rear and pressing against the hub 37 of the end disk 30. This hub 37 is grooved so as to be engaged by the yoke 38 on the rock shaft 39, which rock shaft extends through the casing of the clutch and carries on the end thereof the lever 40 having a foot pedal 41 thereon. When the foot pedal is pressed down as it may be by the operator's foot, the shaft 39 is rocked and the end disk 30 is drawn away from the ring 34 permitting the ring and disk to separate so that the clutch will not transmit the power of the motor. This movement of the rock shaft 39 causes the compression of the spring 35 and when the foot pedal is released the spring will expand pushing the disks together so that the disks 30 will by their frictional engagement with the disk 34 rotate with them as they are carried around by the armature shaft 31.

It will be understood that although a friction clutch of the multiple disk type is here described, that any of the well known types, such as cone, external or internal band, etc., may be used instead.

The armature shaft 31 carries thereon the armature of the motor, which motor will be either a socalled series or shunt motor, although a shunt motor is preferred. The motor will preferably be of the multipolar type, the four pole motor being preferred. The motor is provided with the shell 42 to which the four pole pieces are attached and the ends of the motor casing or shell are closed by the heads 43 and 44 in which the armature shaft 31 has its bearings. Clamped to the motor shell 42 and head 44 is the bell casing 45 of the transmission gear to which in turn is clamped the casing 46 of the transmission gear having a head 47 therein at the front and a head 48 at the rear in which head are journaled the main shaft 18, pocket shaft 19, counter shaft 22 and the stud that carries the idle pinion 28. The top of the casing 46 is closed by the plate 49 through which extends the lever 29.

The motor, clutch and transmission gears with their casings constitute a single structure that is suspended at three points and that can adjust itself to the twisting of the motor frame, due to inequalities of the ground and that can be easily removed from the truck and replaced. This is provided for as follows: Attached to the cross bar 7 is a hanger 65 to which is attached a bearing 66 in which the forward end of the armature shaft is adapted to rotate and by which the forward end of the structure is supported. On the sides of the bell casing 45 is fastened the studs 67 and 68 which engage with bearings 69 and 70 formed on hangers 71 and 72 fastened to the auxiliary side bars 9 and 10. By removing the lower half of each of the bearings 66, 69 and 70 the whole structure forward of the universal joint 17 can be easily removed from the machine. On top of the frame of the truck is carried the storage battery cells which are divided into two sections for convenience, the sections being numbered 50, one of these sections being placed forward of the dash board and the other under the driver's seat. These storage cells are connected up in a single battery which may have any desired voltage. These batteries are provided for the purpose of driving a motor by connections which I will now describe.

In series with the storage battery is placed a choke coil 51 and the armature 52 and fields 53 of the motor, the armature and fields being preferably parallel with each other. The choke coil serves to keep down the rush of current that would strain the batteries and tend to throw out the circuit breaker when the motor is being started. Also in series with the storage battery is the sliding switch 54 and the resistance coils 55, the resistance coils being connected to a series of stationary terminals or contacts in the sliding switch with which a sliding plate of the switch can make contact. Also in series with the storage battery is the overload circuit breaker 56 which is set to break the circuit when a predetermined amount of current flows from the storage battery. The sliding switch 54 will be placed under the toe board 57 through which the stem of the foot pedal 58 extends, the stem being mounted in a socket set in the toe board.

One of the features of my invention is to mount the motor so that its armature may be allowed to run free. This makes it possible to start the motor without any load and attain the desired speed thereon before the clutch is thrown in for the purpose of starting the truck. In practice when it is desired to start the truck, the clutch between the motor and the gearing of the truck will be left open and the sliding contact will be moved so as to close the circuit and place the highest resistance in series with the motor in the battery. This will start the motor and as the speed of the armature increases the resistance will be gradually cut down by the switch until the armature is running without any of the resistance coils in circuit therewith. The armature of the motor will have attained its desired angular velocity and the counter electro motive force will have been developed to correspond. The gearing will then be set so as to drive the car forward through the low speed gear and the clutch will then be eased in starting the truck ahead. The truck will then start and the speed of the truck will increase until it is running as fast as it will on that gear, then the clutch will be thrown out and the gear changed to the intermediate speed gear, after which the clutch will again be eased in and the truck will be driven with increasing speed until it reaches the highest speed that can be attained on that gear, then the clutch will again be opened and the gearing will be shifted to the highest speed gear, after which the clutch will again be eased in and the truck will run until it attains full speed on that gearing.

The foregoing describes the operation of the power generation and power transmission of the truck or car while on ground that is level or nearly so. When the car begins to ascend a grade the clutch will be opened and the gearing will be shifted to the intermediate or low speed as may be needed and the clutch will again be closed.

By building the cars, as above described, and operating them in the manner set forth, the maximum drain on the battery is kept down to only a fraction of what the maximum drain on the battery would be if the motor were directly and positively connected by step down gearing to the main driving or power shaft, and the speed of the motor corresponded to or was proportioned at all times to the speed of the truck.

With my equipment the speed of the motor is attained and its full counter electro motive force is developed before the motor has time to heat and before any serious buckling effect can be produced on the storage battery. The high speed of the armature of the motor is secured before the truck is started and is maintained during the starting of and during all of the running of the truck and the $C^2 R$ loss in the motor and its connections is practically eliminated or is kept down to an amount which will be practically negligible.

I claim:

1. In an electric vehicle the combination of driving wheels, steering wheels and a frame supported thereby, a main shaft, an electric motor having an armature shaft, an intermediate shaft interposed between and lying in a plane contiguous with the main shaft and said armature shaft, a change-speed gearing operatively connecting one end of the intermediate shaft with the main shaft, a frictional clutch adapted to connect the opposite end of the intermediate shaft with the armature shaft for the purpose set forth.

2. In an electric vehicle the combination of driving wheels, steering wheels and a frame supported thereby, a main shaft, an electric motor having an armature shaft, an intermediate shaft, and disk keyed upon the armature shaft, one end of said intermediate shaft being journaled within said disk, a change-speed device, means for operatively connecting the change-speed device with the main shaft, said motor being adapted to start and run free and a clutch for operatively connecting the disk with the intermediate shaft for the purpose of driving it after the motor has attained normal speed.

3. In a motor vehicle the combination with a frame comprising a pair of side bars, cross-bars connected to the side bars, a pair of auxiliary bars arranged within the frame extending parallel with the side bars having their ends connected to the cross-bars, a casing having a motor, clutch and gear transmission arranged therein, laterally extending studs arranged at each side of the casing, bearings carried by said auxiliary bars for detachably connecting the studs thereto, a shaft extending from the casing at one end thereof, a bearing carried by one of the cross-bars and said shaft being detachably journaled within the bearing carried by the cross-bar whereby the casing will be suspended from the frame of the vehicle at three points.

4. In a motor vehicle the combination of a frame comprising side bars, a pair of auxiliary bars arranged within said bars of the frame and extending parallel therewith, cross-bars connecting the auxiliary bars to the side bars of the frame, bearings suspended from the auxiliary bars and from one of the cross-bars, a casing having a motor, clutch and gear transmission arranged therein, studs extending laterally from the medial portion of the casing and detachably mounted within the bearings carried by the auxiliary bars and means for detachably connecting one end of the casing to one of the cross-bars for the purpose set forth.

5. In a motor vehicle the combination of a frame, a cylindrical casing having a motor arranged therein, a shaft journaled within said casing, a casing having a sliding gear transmission arranged therein, a bell-shaped casing having a clutch arranged therein and connecting the first two mentioned casings, a pair of studs diametrically arranged upon said bell-shaped casing and extending therefrom, an auxiliary frame rigidly mounted within said frame, means for detachably connecting the studs carried by said bell-shaped casing with said auxiliary frame and a hanger depending from said auxiliary frame in which is adapted to be detachably journaled one end of said shaft.

In testimony whereof I affix my signature.

FREDERICK J. DECKER.